(12) United States Patent
Nitta

(10) Patent No.: US 7,627,309 B2
(45) Date of Patent: Dec. 1, 2009

(54) METHOD OF SHARING INFORMATION RELATING TO AN INFORMATION TRANSMITTING MEDIUM AMONG MOBILE TERMINALS

(75) Inventor: Yoshio Nitta, Tokyo (JP)

(73) Assignee: NEC Corporation, Tokyo (JP)

( * ) Notice: Subject to any disclaimer, the term of this patent is extended or adjusted under 35 U.S.C. 154(b) by 619 days.

(21) Appl. No.: 10/940,530

(22) Filed: Sep. 14, 2004

(65) Prior Publication Data

US 2005/0064867 A1    Mar. 24, 2005

(30) Foreign Application Priority Data

Sep. 18, 2003   (JP)   ............................. 2003-326099

(51) Int. Cl.
*H04M 3/42*   (2006.01)

(52) U.S. Cl. ................ 455/414.2; 455/414.3; 455/41.2; 455/456.3; 340/10.1; 340/10.41; 340/593.11; 340/572.1

(58) Field of Classification Search .............. 455/414.2, 455/414.3, 41.2, 456.1–456.6; 340/10.1, 340/10.41, 593.11, 572.1
See application file for complete search history.

(56) References Cited

U.S. PATENT DOCUMENTS

| | | | | |
|---|---|---|---|---|
| 6,055,434 | A * | 4/2000 | Seraj ..................... | 455/456.1 |
| 6,167,277 | A * | 12/2000 | Kawamoto ................ | 455/457 |
| 6,912,398 | B1 * | 6/2005 | Domnitz .................. | 455/461 |
| 2002/0116268 | A1 * | 8/2002 | Fukuda ..................... | 705/14 |
| 2003/0061110 | A1 | 3/2003 | Bodin | |
| 2003/0120555 | A1 * | 6/2003 | Kitagawa ................. | 705/26 |
| 2006/0075021 | A1 * | 4/2006 | Sugiyama et al. .......... | 709/203 |
| 2006/0166617 | A1 * | 7/2006 | Passmore ................. | 455/3.06 |

FOREIGN PATENT DOCUMENTS

| | | |
|---|---|---|
| EP | 1 460 573 A2 | 9/2004 |
| GB | 2 380 905 A | 4/2003 |
| JP | 2002-7250 | 1/2002 |
| JP | 269508/2002 | 9/2002 |
| JP | 324021/2002 | 11/2002 |
| JP | 2003-036215 | 2/2003 |
| JP | 2003-85387 | 3/2003 |
| JP | 2004-235713 | 8/2004 |

* cited by examiner

*Primary Examiner*—Nick Corsaro
*Assistant Examiner*—Dung Lam
(74) *Attorney, Agent, or Firm*—Scully, Scott, Murphy & Presser, P.C.

(57) ABSTRACT

The information sharing method of the present invention is realized by an information sharing system that includes: first and second mobile terminals and an information sharing server. The first mobile terminal first reads, from a radio tag that is embedded in an information transmitting medium, positional information and an identification number of the information transmitting medium, and then transmits this information to the information sharing server. The information sharing server selects relevant information that shows detailed content of the information transmitting medium based on the identification number of the information transmitting medium that has been transmitted in from the first mobile terminal. The information sharing server then transmits the positional information of the information transmitting medium that has been transmitted in from the first mobile terminal and the above-described relevant information of the information transmitting medium that has been selected to the second mobile terminal.

9 Claims, 3 Drawing Sheets

METHOD OF SHARING INFORMATION RELATING TO AN INFORMATION TRANSMITTING MEDIUM AMONG MOBILE TERMINALS

BACKGROUND OF THE INVENTION

1. Field of the Invention

The present invention relates to an information sharing method, an information sharing system, and an information sharing server for sharing, among mobile terminals, information relating to an information transmitting medium in which is embedded a radio tag, which can be represented by an RFID (Radio Frequency Identification) tag.

2. Description of the Related Art

Radio tags, of which RFID tags are representative, transmit by radiowaves information that has been written into these radio tags. Recently, a wide variety of technologies have been disclosed that use radio tags.

As one example, Japanese Patent Laid-Open Publication No. 269508/2002 (hereinbelow referred to as Patent Document 1) discloses a technique in which a radio tag, in which a URL (Uniform Resource Locator) for directing inquiries is written, is embedded into a poster for advertising a movie or article. In addition, Japanese Patent Laid-Open Publication No. 324021/2002 (hereinbelow referred to as Patent Document 2) discloses a technique for embedding into an advertisement a radio tag in which is written the URL of a server that provides relevant information (detailed content of the advertisement). These techniques have the advantage of allowing the owner of a mobile terminal that receives the URL from the advertisement to use the URL to access the Internet home page and thus obtain information regarding the advertisement.

Patent Document 2 further discloses a technique in which positional information such as the latitude and longitude or the address of the location where the advertisement is provided is written into a radio tag that is embedded in the advertisement. This technique has the advantage of enabling the owner of a mobile terminal that is located in the vicinity of the location in which the advertisement is posted to obtain positional information from the radio tag.

However, there is a demand from owners of mobile terminals who wish to use the radio tag that is embedded in an advertisement to not only obtain relevant information or positional information regarding the advertisement but to also share the acquired information with other owners of mobile terminals.

If the above-described demand were realized, the owner of a mobile terminal would be able to inform the owner of another mobile terminal of his or her own current positional information, and would therefore be able to, for example, inform his or her family at home of his or her own current location when returning home. In addition, the owner of a mobile terminal would be able to share with the owner of another mobile terminal information regarding a movie or article, and would therefore be able to, for example, make a plan to go to see the movie or make a plan to purchase the article.

However, the techniques that are disclosed in Patent Documents 1 and 2 assume that only the owner of a mobile terminal will use the relevant information or positional information of an advertisement, and as a result, do not take into the consideration the sharing of the information that is obtained from the advertisement with the owner of another mobile terminal and therefore cannot meet the above-described demands of owners of mobile terminals.

From the standpoint of service providers that provide services to mobile terminals, on the other hand, there is a desire to collect the positional information of mobile terminals and information of advertisements that have been accessed by these mobile terminals in order to learn what sort of places the owners of these mobile terminals go and what sort of advertisements they notice. Such information would allow service providers to offer services that are useful to these owners.

However, it is assumed that communications common carriers have currently taken the lead in collecting the positional information of mobile terminals, and service providers therefore collect the positional information of mobile terminals by using positional information providing services that belong to the communications common carrier. As a result, the positional information that is collected by service providers by means of the positional information providing services of the common carrier is not necessarily suited to services that are offered by the service providers. In addition, service providers, by using a positional information providing services belonging to a communications common carrier to collect positional information, are compelled to pay a high price to collect positional information.

SUMMARY OF THE INVENTION

It is an object of the present invention to provide an information sharing method, an information sharing system, and an information sharing server that allow sharing of information relating to an information transmitting medium such as an advertisement that has been acquired by the owner of a particular mobile terminal with owners of other mobile terminals.

The information sharing method according to the present invention is realized by an information sharing system that includes: first and second mobile terminals; and an information sharing server for sharing information regarding an information transmitting medium that has been obtained by the owner of the first mobile terminal with the owner of the second mobile terminal.

In the information sharing method of the present invention, the first mobile terminal first reads the positional information and the identification number of an information transmitting medium from a radio tag that is embedded in the information transmitting medium that is provided in any location, and then transmits the information to the information sharing server. The information sharing server then selects relevant information that shows detailed content of the information transmitting medium based on the identification number of the information transmitting medium. The information sharing server then transmits the positional information and the relevant information of the information transmitting medium to the second mobile terminal.

This configuration allows positional information of an information transmitting medium that is in the vicinity of the first mobile terminal, i.e., the current positional information of the first mobile terminal, to be shared between the owners of the first and second mobile terminals. The owner of the first mobile terminal who is on the way home is thus enabled to report his or her present location to the second mobile terminal that belongs to his or her family at home.

In addition, the owner of the first mobile terminal can actually see the information transmitting medium and acquire information relating to the content of that information transmitting medium, and further, the owner of the second mobile terminal can also obtain information relating to the content of the information transmitting medium by means of the relevant information of the information transmitting medium.

The owners of the first and second mobile terminals can therefore share information relating to the content of the information transmitting medium, and accordingly, the owners of the first and second mobile terminals, can, for example, decide whether or not to go see a movie that appears in the information transmitting medium, or go to purchase an article that appears in the information transmitting medium.

In addition, by operating an information sharing server, a service provider can collect the positional information of the first mobile terminal without having to use the positional information providing service of a communication common carrier, and the service provider can therefore collect positional information of the first mobile terminal at a low cost. The service provider can also collect, in addition to the positional information of the first mobile terminal, information such as the date and time that the first mobile terminal accessed the information transmitting medium, and the service provider therefore enjoys a greater potential to obtain useful information that is suited to the services that the service provider provides.

Still further, the information sharing server may also transmit relevant information of the information transmitting medium to the first mobile terminal at the same time that it transmits the relevant information and positional information of the information transmitting medium to the second mobile terminal.

This provision enables the owner of the first mobile terminal to not only obtain information by actually viewing the information transmitting medium, but to also obtain the same information as the information that is transmitted to the second mobile terminal as relevant information of the information transmitting medium, and the owner of the first mobile terminal can therefore share absolutely identical information with the owner of the second mobile terminal.

In addition, the information sharing server may perform processing for granting prescribed special favors to the first mobile terminal and/or the second mobile terminal in accordance with the state of use of the service for transmitting relevant information and positional information of the information transmitting medium to the second mobile terminal.

By means of this provision, the owners of the first and second mobile terminals can be encouraged to use the service, and it can therefore be expected that owners of the first and second mobile terminals will use the service more frequently in the future.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1:
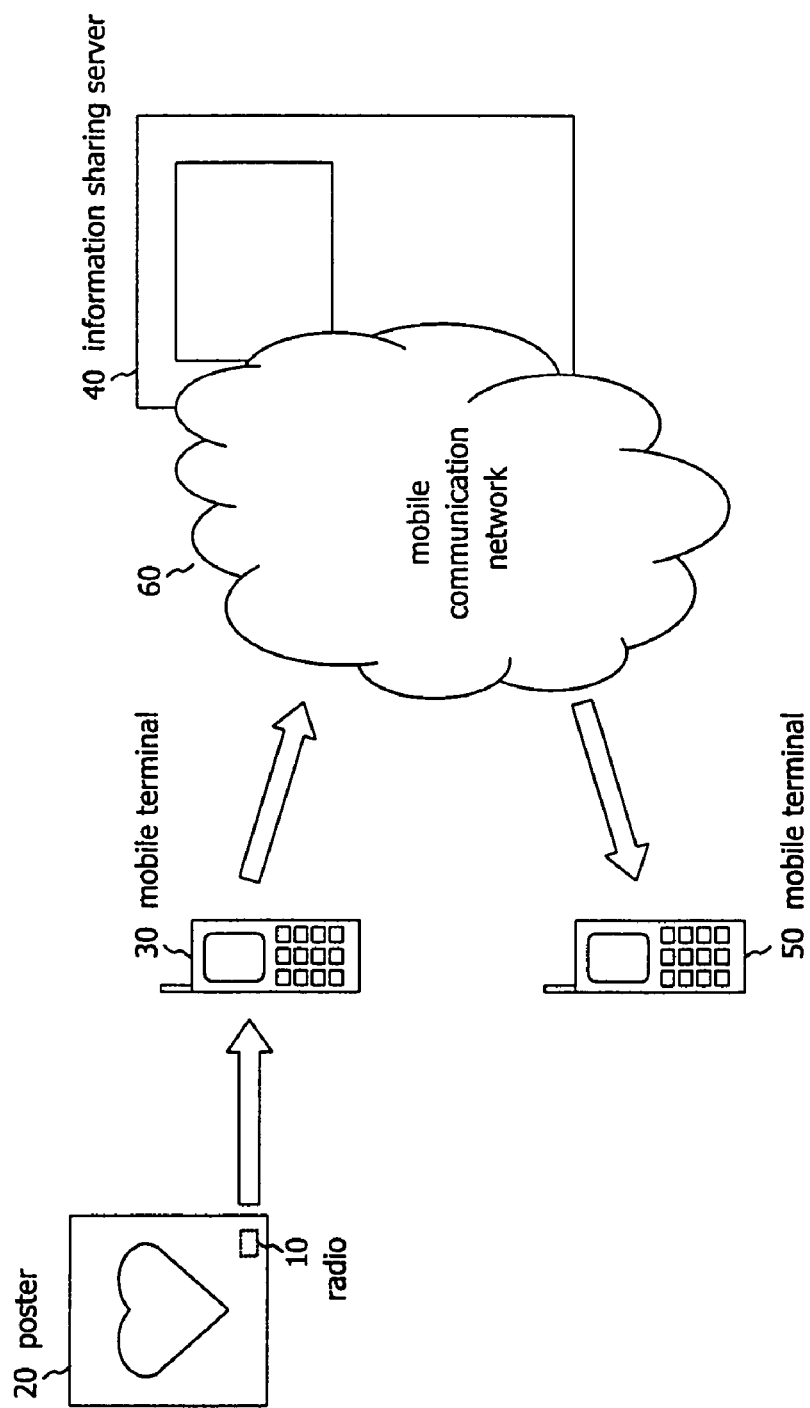
FIG. 1 shows the configuration of the information sharing system according to an embodiment of the present invention.

Explanation next regards the configuration of the information sharing system according to an embodiment of the present invention with reference to FIG. 1.

Referring to FIG. 1, the information sharing system according to an embodiment of the present invention includes: mobile terminal 30 that is capable of reading information that is written in radio tag 10 that is embedded in poster 20, which is an information transmitting medium; mobile terminal 50 that communicates with mobile terminal 30; information sharing server 40, which is a server that is operated by the service provider for sharing information that relates to poster 20 that has been obtained by the owner of mobile terminal 30 with the owner of mobile terminal 50; mobile communication network 60, which is a network for interconnecting mobile terminals 30 and 50 and information sharing server 40.

Although only one poster 20 is shown in FIG. 1 for the sake of convenience, it is assumed that a large number of posters 20 are actually provided in any of a wide variety of locations throughout the country. Further, only one mobile terminal is shown for each of mobile terminal 30 and 50, but no limit is imposed on the numbers of mobile terminals 30 and 50 and a plurality of each may exist.

Poster 20 is posted to advertise a movie, article, or event, and radio tags 10 in which different information is written are embedded in each poster 20.

Radio tag 10 is an RFID tag in which the positional information and poster ID of poster 20 are written. The positional information of poster 20 is information such as an address or any facility (for example, "XX Subway Line, first exit") that serves as a guide for indicating the position of the place in which poster 20 is provided. The poster ID of poster 20 is an ID number for identifying each of posters 20 in information sharing server 40. In information sharing server 40, the posted content, information such as the posted time interval, the positional information, and the number of times that poster 20 has been accessed is specified based on the poster ID of poster 20.

Radio tag 10 may be an active type that incorporates a battery and sends its own radiowaves, or may be a passive type that does not incorporate a battery and that sends radiowaves in response to a prompt from mobile terminal 30. In addition, radio tag 10 is preferably thin in order to allow embedding in poster 20.

Figure 2:
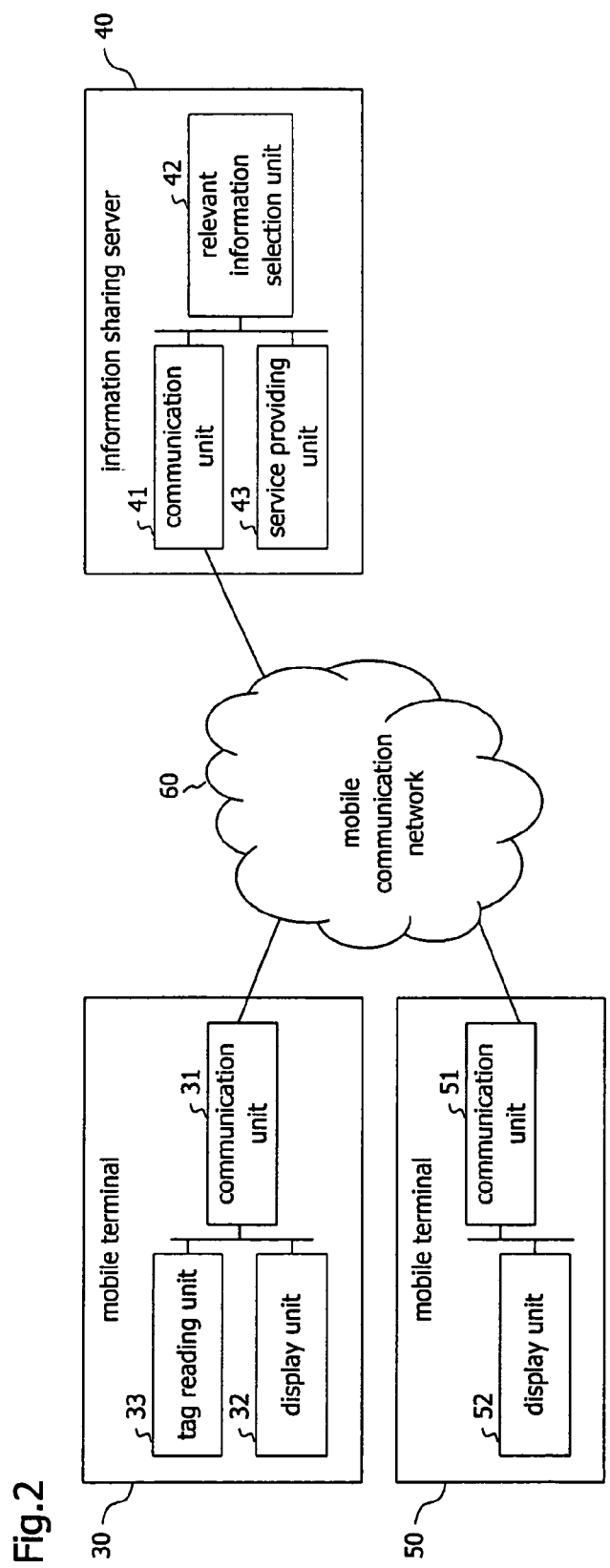
FIG. 2 shows the configuration of the mobile terminal and the information sharing server that are shown in FIG. 1.

Referring now to FIG. 2, explanation next regards the configuration of mobile terminals 30 and 50 and information sharing server 40 that are shown in FIG. 1.

Referring to FIG. 2, mobile terminal 30 includes: communication unit 31 for performing mobile communication by way of mobile communication network 60; display unit 32 for displaying various information; and tag reading unit 33 for reading the positional information and poster ID of poster 20 that are written in radio tag 10.

Mobile terminal 50 includes communication unit 51 for performing mobile communication by way of mobile communication network 60, and display unit 52 for displaying various information. In addition, mobile terminal 50, as with mobile terminal 30, may be equipped with the capability for reading information that is written in radio tag 10.

Information sharing server 40 includes: communication unit 41 for performing mobile communication by way of mobile communication network 60; relevant information selection unit 42 for, based on the poster ID of poster 20, selecting relevant information that shows detailed content of poster 20 when the positional information and poster ID of poster 20 have been sent in from mobile terminal 30; service providing unit 43 for providing the service of transmitting to mobile terminal 30 the positional information of poster 20 that shows the position of mobile terminal 30 and the relevant information of poster 20 that has been selected in relevant information selection unit 42 when the positional information and poster ID of poster 20 have been transmitted in from mobile terminal 30.

Figure 3:
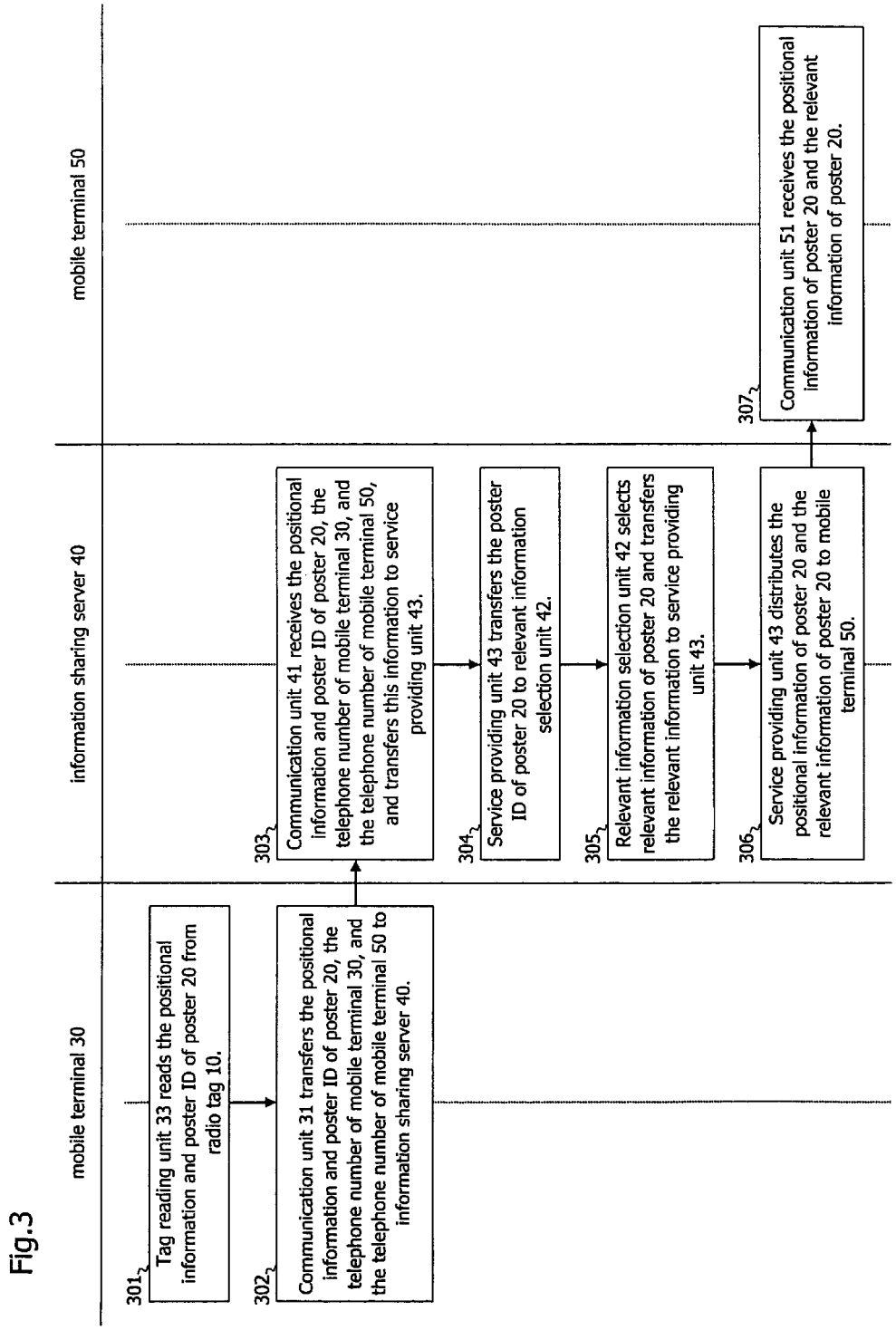
FIG. 3 is a flow chart for explaining the process of the information sharing method that is realized by the information sharing system that is shown in FIG. 1.

Referring now to the flow chart of FIG. 3, explanation next regards the procedures of the information sharing method that is realized by the information sharing system that is shown in FIG. 1. Explanation here regards the procedures when positional information and poster ID that have been read by mobile terminal 30 from radio tag 10 that is embedded in poster 20 are shared between mobile terminals 30 and 50.

Referring to FIG. 3, tag reading unit 33 inside mobile terminal 30 first reads the positional information and poster ID of poster 20 from radio tag 10 that is embedded in poster 20 in Step 301. For example, if radio tag 10 is the passive type, a high-frequency signal is supplied from the antenna (not shown) in tag reading unit 33 inside mobile terminal 30, this high-frequency signal is received by an antenna (not shown) that is provided in radio tag 10, and internal electromotive force is thus generated to operate radio tag 10. By means of the antenna, radio tag 10 sends a signal of the positional information and poster ID of poster 20 that it stores. At this time, of the information that has been read from radio tag 10, the positional information of poster 20 is displayed as characters on display unit 32 inside mobile terminal 30.

Next, in Step 302, communication unit 31 in mobile terminal 30 adds the telephone number of mobile terminal 30, which is the transmission origin, and the telephone number of mobile terminal 50, which is the transmission destination, to the positional information and poster ID of poster 20 that have been read from radio tag 10 by means of tag reading unit 33, and then transmits this information to information sharing server 40 by way of mobile communication network 60.

In Step 303, communication unit 41 in information sharing server 40, upon receiving the information (the positional information of poster 20, the poster ID of poster 20, the telephone number of mobile terminal 30, and the telephone number of mobile terminal 50) that has been transmitted in from mobile terminal 30, transfers this information to service providing unit 43.

Of the information that has been transferred in from communication unit 41, service providing unit 43 in information sharing server 40 next transfers the poster ID of poster 20 to relevant information selection unit 42 in Step 304. At this time, service providing unit 43 may record in a memory (not shown) information such as the telephone number of mobile terminal 30 that has accessed poster 20 or the date and time that mobile terminal 30 accessed poster 20. As will later be explained, the information that is recorded in this memory can be effectively utilized in the future by the service provider that operates information sharing server 40.

Next, in Step 305, relevant information selection unit 42 in information sharing server 40 selects optimum relevant information that relates to poster 20 based on the poster ID of poster 20 that has been transferred in from service providing unit 43 and transfers this information to service providing unit 43. For example, if poster 20 is a poster advertising a movie, relevant information selection unit 42 selects relevant information such as the content of the movie, the movie theaters in the vicinity of the location in which poster 20 is posted that are showing the movie, and the show times of these theaters.

In Step 306, service providing unit 43 in information sharing server 40 uses communication unit 41 to transmit the relevant information of poster 20 that has been selected by relevant information selection unit 42, and, of the information that has been sent in from mobile terminal 30, the positional information of poster 20 that shows the position of mobile terminal 30, to mobile terminal 50 by way of communication network 60. At this time, service providing unit 43 may transmit the relevant information of poster 20 to mobile terminal 30 at the same time that it transmits the positional information of poster 20 and the relevant information of poster 20 to mobile terminal 50.

In Step 307, communication unit 51 in mobile terminal 50 receives the positional information of poster 20 and the relevant information of poster 20 that have been transmitted in from information sharing server 40. At this time, the positional information of poster 20 and the relevant information of poster 20 that have been received in communication unit 51 are displayed on display unit 52 in mobile terminal 50.

As described hereinabove, in information sharing server 40 in the present embodiment, when the positional information and poster ID of poster 20 have been transmitted in from mobile terminal 30, the positional information of poster 20 that show the position of mobile terminal 30 and relevant information of poster 20 that have been selected based on the poster ID of poster 20 are transmitted to mobile terminal 50.

As a result, the positional information of poster 20 that is in the vicinity of mobile terminal 30, i.e., current positional information of mobile terminal 30, can be shared between the owners of mobile terminals 30 and 50. In addition, the owner of mobile terminal 30 can actually see the poster 20 and acquire information relating to the content of poster 20, and the owner of mobile terminal 50 can also obtain information relating to the content of poster 20 by means of the relevant information of poster 20, whereby information relating to the content of poster 20 can be shared between the owners of mobile terminals 30 and 50.

Accordingly, when on the way home, the owner of mobile terminal 30 can report his or her current location to mobile terminal 50 that belongs to his or her family at home. In addition, if poster 20 is a poster for advertising a movie, the owners of mobile terminals 30 and 50 can together decide whether or not to go see the movie based on shared information relating to the movie. Further, if poster 20 is a poster for advertising an article, the owners of mobile terminals 30 and 50 can determine whether or not to go purchase the article based on shared information relating to the article.

In addition, the service provider that operates information sharing server 40 can collect positional information of mobile terminal 30 without using a positional information providing service of the communications common carrier and therefore can collect positional information of mobile terminal 30 at a low cost. As previously described, in addition to the positional information of mobile terminal 30, the service provider is also able to collect information such as the date and time that mobile terminal 30 accessed poster 20, increasing the potential for the service provider to obtain useful information that complements services that the service provider provides.

In the present embodiment, service providing unit 43 may be configured to implement processing to grant prescribed special favors to mobile terminal 30 and/or mobile terminal 50 according to the state of use of the above-described service. For example, service providing unit 43 may execute processing for granting specific points to mobile terminal 30 and/or mobile terminal 50 for each use of the above-described service and managing the number of points that have been granted. The service provider can thus ascertain the state of use of the above-described service. As examples of the prescribed special favor, the charges for using the above-described service may be discounted or provided free of charge according to the number of points. When awarding such special favors, service providing unit 43 may implement processing such as controlling an accounting unit (not shown) and then adjusting the amount of charges to mobile terminal 30 and/or mobile terminal 50. Other prescribed special favors might include, for example, offering a gift when a prescribed number of points has been attained.

Although an example has been described in the present embodiment in which poster 20 has been adopted as the information transmitting medium, the present invention is not limited to this form. In other words, the present invention permits the adoption of any medium for transmitting information as the information transmitting medium. For example, the present invention permits the application not only of a directions board or a map board, but even a utility pole or a road as the information transmitting medium. When a road is adopted as the information transmitting medium, radio tag 10 may be embedded inside the road.

A configuration was described in the present embodiment in which, when communicating data between mobile terminals 30 and 50, the communication partner was specified by a telephone number and the data then communicated, but the present invention is not limited to this form. For example, the present invention permits a case in which data communication between mobile terminals 30 and 50 is realized by electronic mail, and the communication partner is specified by an electronic mail address instead of by a telephone number.

Further, although a configuration was described in the present embodiment in which all constituent elements in information sharing server 40 were operated by the service provider, the present invention is not limited to this form. More specifically, the present invention also permits a form in which the service provider performs a portion of the business of another business entity (for example, the advertiser of poster 20). For example, the present invention permits a form in which the service provider operates only communication unit 41 and service providing unit 43 in information sharing server 40, and the above-described other business entity operates relevant information selection unit 42.

Although a case was described in the present invention in which radio tag 10 was used, a two-dimensional code may be used instead. In such a case, a portable telephone having a two-dimensional code recognition capability may be used as mobile terminal 30. Portable telephones having this capability are already being marketed. Software for converting a two-dimensional code that has been read by a built-in camera to character/numerical data is incorporated in the portable telephone. The owner of the portable telephone holds the built-in camera of the portable telephone close to the two-dimensional code to read the code, and the characters and numbers contained within the two-dimensional code are thus recognized by the portable telephone. A well-known code such as QR code may be used as the two-dimensional code. For example, if the information transmitting medium is a poster, the two-dimensional code may be applied to or printed on the poster in a corner position to which the owner can bring the portable telephone.

While a preferred embodiment of the present invention has been described using specific terms, such description is for illustrative purposes only, and it is to be understood that changes and variations may be made without departing from the spirit or scope of the following claims.

What is claimed is:

1. An information sharing method having an information sharing system comprising first and second mobile terminals and an information sharing server for sharing information regarding an information transmitting medium obtained by the owner of said first mobile terminal, for sharing with the owner of said second mobile terminal, said information sharing method comprising:

a first step in which said first mobile terminal reads positional information and an identification number of said information transmitting medium, said positional information and said identification number provided in any location from a radio tag embedded in said information transmitting medium and then said first mobile terminal transmits the positional information and said identification number to said information sharing server by way of a network;

a second step in which said information sharing server selects relevant information comprising at least detailed content of said information transmitting medium, based on the identification number of said information transmitting medium;

a third step in which said information sharing server transmits the positional information of said information transmitting medium, said positional information further comprising at least a position of said first mobile terminal and the relevant information of said information transmitting medium to said second mobile terminal by way of said network, and said information sharing server also transmits relevant information of said information transmitting medium to said first mobile terminal by way of said network simultaneously with transmitting the relevant information of said information transmitting medium and the positional information of said information transmitting medium to said second mobile terminal by way of said network.

2. An information sharing method according to claim 1, further comprising a fourth step in which said information sharing server implements processing for granting a prescribed special favor to said first mobile terminal and/or said second mobile terminal in accordance with the state of use of the service in which relevant information of said information transmitting medium and positional information of said information transmitting medium are transmitted to said second mobile terminal by way of said network.

3. An information sharing method according to claim 1, wherein a two-dimensional code is used in place of said radio tag.

4. An information sharing system, comprising:

first and second mobile terminals; and an information sharing server for sharing information relating to an information transmitting medium that has been acquired by the owner of said first mobile terminal with the owner of said second mobile terminal;

wherein said first mobile terminal comprises:

means for reading, from a radio tag embedded in said information transmitting medium provided in any location, positional information and an identification number of the information transmitting medium; and means for transmitting the positional information and the identification number of said information transmitting medium to said information sharing server by way of a network;

and said information sharing server comprises:

relevant information selection means for, when the positional information and the identification number of said information transmitting medium have been transmitted from said first mobile terminal by way of said network, selecting relevant information comprising at least detailed content of said information transmitting medium based on the identification number of said information transmitting medium; and service providing means for, when the positional information and identification number of said information transmitting medium are transmitted from said first mobile terminal by way of said network, transmitting the positional information of said information transmitting medium, said positional information further comprising at least a position of said first mobile terminal and the relevant information of said information transmitting medium to said second mobile terminal by way of said network, and said service providing means also transmits relevant information of said information transmitting medium to said first mobile terminal by way of said network simultaneously with transmitting the relevant information of said information transmitting medium and the positional information of said information transmitting medium to said second mobile terminal by way of said network.

5. An information sharing system according to claim 4, wherein said service providing means implements processing for granting prescribed special favors to said first mobile terminal and/or said second mobile terminal in accordance with the state of use of the service of transmitting relevant information of said information transmitting medium and positional information of said information transmitting medium to said second mobile terminal by way of said network.

6. An information sharing system according to claim 4, wherein two-dimensional code is used in place of said radio tag.

7. An information sharing server for sharing information relating to an information transmitting medium acquired by an owner of a first mobile terminal with an owner of a second mobile terminal; said information sharing server comprising:
relevant information selection means for, when positional information and an identification number of said information transmitting medium written in a radio tag embedded in said information transmitting medium provided in any location are transmitted from said first mobile terminal by way of a network, selecting relevant information comprising at least detailed content of said information transmitting medium based on the identification number of said information transmitting medium; and a service providing means for, when the positional information and the identification number of said information transmitting medium have been transmitted from said first mobile terminal by way of said network, transmitting the positional information of said information transmitting medium, said positional information further comprising at least a position of said first mobile terminal and relevant information of said information transmitting medium selected in said relevant information selection means to said second mobile terminal by way of said network, and said service providing means also transmits relevant information of said information transmitting medium to said first mobile terminal by way of said network simultaneously with transmitting the relevant information of said information transmitting medium and the positional information of said information transmitting medium to said second mobile terminal by way of said network.

8. An information sharing server according to claim 7, wherein said service providing means implements processing for granting prescribed special favors to said first mobile terminal and/or said second mobile terminal in accordance with the state of use of the service of transmitting relevant information of said information transmitting medium and positional information of said information transmitting medium to said second mobile terminal by way of said network.

9. An information sharing server according to claim 7, wherein a two-dimensional code is used in place of said radio tag.

* * * * *